United States Patent [19]

Tsuchiya et al.

[11] Patent Number: 5,144,537

[45] Date of Patent: Sep. 1, 1992

[54] ELECTRIC DOUBLE LAYER CAPACITOR

[75] Inventors: Yoshinobu Tsuchiya, Fujisawa; Ken Kurabayashi, Chigasaki; Yoriaki Niida, Yamato, all of Japan

[73] Assignee: Isuzu Motors Limited, Tokyo, Japan

[21] Appl. No.: 635,038

[22] Filed: Dec. 28, 1990

[30] Foreign Application Priority Data

Dec. 28, 1989 [JP] Japan .................................. 1-341003

[51] Int. Cl.$^5$ ............................................... H01G 9/00
[52] U.S. Cl. ..................................... 361/502; 29/25.03
[58] Field of Search ......................... 29/25.03; 361/502

[56] References Cited

U.S. PATENT DOCUMENTS

| | | | |
|---|---|---|---|
| 3,536,963 | 10/1970 | Boos | 361/502 |
| 4,542,444 | 9/1985 | Boland | 361/502 |
| 4,626,964 | 12/1986 | Azuma et al. | 361/502 |
| 4,862,328 | 8/1989 | Morimoto et al. | 361/502 |

Primary Examiner—Donald A. Griffin
Attorney, Agent, or Firm—Staas & Halsey

[57] ABSTRACT

An electric double which utilizes the principles of an electric double layer in the interface between polarized electrodes and an electrolyte, each of the polarized electrodes being composed of minute active carbon particles of coal tar which have a specific surface area ranging from 1,000 to 4,000 m$^2$/gram. Many such minute active carbon particles are packed in a unit volume for an increased electrostatic capacitance.

14 Claims, 5 Drawing Sheets

| SAMPLE | ACTIVE CARBON MATERIAL | SPECIFIC SURFACE AREA | AVERAGE PARTICLE DIAMETER |
|---|---|---|---|
| A | COAL TAR | 1000 | 5 |
| B | COAL TAR | 2000 | 5 |
| C | COAL TAR | 3000 | 5 |
| D | COAL TAR | 4000 | 5 |
| E | COAL TAR | 5000 | 5 |
| F (CONVENTIONAL) | PHENOLIC RESIN | 1600 | 5 |
| G (CONVENTIONAL) | PETROLEUM COKE | 3000 | 5 |

FIG. 3

| | ELECTRO-STATIC CAPACITANCE F | PACKING DENSITY g/cm$^3$ | PACKING SPECIFIC SURFACE AREA (m$^2$/cm$^3$) |
|---|---|---|---|
| A | 26.5 | 0.76 | 760 |
| B | 41.5 | 0.60 | 1200 |
| C | 46.0 | 0.44 | 1320 |
| D | 44.5 | 0.32 | 1280 |
| E | 26 | 0.15 | 750 |
| F | 31 | 0.56 | 896 |
| G | 34.5 | 0.33 | 990 |

FIG. 5

| | ACTIVE CARBON MATERIAL | SPECIFIC SURFACE AREA m²/g | AVERAGE PARTICLE DIAMETER μm |
|---|---|---|---|
| A (INVENTIVE) | COAL TAR | 1600 | 20 μm 5 μm |
| B (CONVENTIONAL) | PHENOLIC RESIN | 1600 | 2.5 μm |

FIG. 6

| | MEASUREMENTS | | ANALYSIS | | |
|---|---|---|---|---|---|
| | ELECTRO-STATIC CAPACITANCE (F) | EQUIVALENT SERIES RESISTANCE (Ω) | $C_u$ F/cm³ | $C_m$ F/g | ρ g/cm³ |
| A | 33.6 | 0.02 | 35.75 | 55 | 0.65 |
| B | 31.0 | 0.07 | 33.0 | 55 | 0.6 |

$C_u$ = CAPACITANCE PER UNIT VOLUME OF CARBON-PASTE ELECTRODE
$C_m$ = CAPACITANCE PER WEIGHT OF ACTIVE CARBON-IN CARBON PASTE ELECTRODE
ρ = PACKING DENSITY - OF ACTIVE CARBON IN CARBON - PASTE ELECTRODE

FIG. 7

| PARTICLE DIAMETER | SPECIFIC SURFACE AREA | MIXTURE RATIO |
|---|---|---|
| 20 μm | 3000 m²/gr | 1 |
| 5 μm | | 0.2 |

FIG. 8

| ELECTRO-STATIC CAPACITANCE (F) | EQUIVALENT SERIES RESISTANCE (Ω) | Cu F/cm³ | Cm F/g | ρ g/cm³ |
|---|---|---|---|---|
| 43.8 | 0.02 | 46.5 | 122 | 0.38 |

FIG. 9

| ELECTRO-STATIC CAPACITANCE (F) | EQUIVALENT SERIES RESISTANCE (Ω) | Cu F/cm³ | Cm F/g | ρ g/cm³ |
|---|---|---|---|---|
| 48.2 | 0.02 | 51.2 | 122 | 0.42 |

ELECTRIC DOUBLE LAYER CAPACITOR

BACKGROUND OF THE INVENTION

The present invention relates to an electric double layer capacitor which utilizes the principles of an electric double layer in the interface between a polarized electrode and an electrolyte, and more particularly to an electric double layer capacitor having improved polarized electrodes.

There have heretofore been well known electric double layer capacitors which include electrodes made of fine powder of carbon. The conventional electric double layer capacitors comprise two electrodes divided by an ion-permeable membrane and each made of a kneaded paste of fine carbon fiber dispersed in an electrolytic solution, and current collectors electronically connected to the respective electrodes. The electric double layer capacitors can be charged or discharged when a voltage is applied or removed from between the current collectors.

Various attempts have been made to increase the capacitance of such electric double layer capacitors. For example, Japanese Laid-Open Patent Publication No. 1(1989)-102914 discloses an electric double layer capacitor which has electrodes each made of a mixture of fine powder of active carbon of phenolic resin and an electrolytic solution of sulfuric acid. The fine active carbon powder has an average particle diameter ranging from 1.5 $\mu$m to 4 $\mu$m and a specific surface area ranging from 1,000 to 1,500 $m^2$/gram The active carbon powder of the above nature is highly effective to increase the electrostatic capacitance of the electric double layer capacitor, and reduce the equivalent series resistance thereof.

The process of manufacturing fine active carbon powder of phenolic resin is however complex, and requires a pulverizer for pulverizing the material into active carbon particles whose diameter ranges from 1.5 $\mu$m to 4 $\mu$m. Accordingly, the manufactured fine active carbon powder is expensive.

Since the particle diameters of the fine active carbon powder are very small, the fine active carbon powder cannot easily be handled as it tends to fly up with weak air streams when the electrodes of the electric double layer capacitor are fabricated. In addition, the maximum specific surface area of the fine active carbon powder of phenolic resin is 2,000 $m^2$/gram, imposing a certain limitation on the electrostatic capacitance that can be achieved by the electric double layer capacitor.

Another electric double layer capacitor disclosed in Japanese Laid-Open Patent publication No. 63(1988)-78514 comprises electrodes of fine active carbon powder of coke.

The fine active carbon powder of coke is manufactured by pulverizing coke into particles of 100 mesh or less in streams of nitrogen Therefore, the manufacturing process is complex and time-consuming. Because the particles of the produced fine active carbon powder are not spherical in shape, the electrostatic capacitance of the electric double layer capacitor cannot be increased as much as expected even if the fine active carbon powder has a relatively high specific surface area.

SUMMARY OF THE INVENTION

It is an object of the present invention to provide an electric double layer capacitor which comprises polarized electrodes made of fine active carbon powder with as high a specific surface area as possible, which fine active carbon powder is packed as much as possible in a given volume, so that the electric double layer capacitor has a relatively high electrostatic capacitance.

According to the present invention, there is provided an electric double layer capacitor comprising a gasket assembly defining a space therein, a pair of polarized electrodes disposed in the space, an isolating membrane disposed between the polarized electrodes, and a pair of current collectors disposed on and bonded to upper and lower surfaces, respectively, of the packing assembly and the polarized electrodes, each of the polarized electrodes being composed of minute active carbon particles of coal tar which have a specific surface area ranging from 1,000 to 4,000 $m^2$/gram, and an electrolytic solution.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a diagram showing a table of electrostatic capacitances, packing densities, and packing specific surface areas of the polarized electrodes of the inventive and conventional electric double layer capacitors shown in FIG. 2;

FIG. 5 is a diagram showing a table of specific surface areas and average particle diameters of active carbon materials of another inventive electric double layer capacitor and another conventional electric double layer capacitor;

FIG. 6 is a diagram showing a table of various characteristics of the polarized electrodes of the inventive and conventional electric double layer capacitors shown in FIG. 5;

FIG. 7 is a diagram showing a table of particle diameters, a specific surface area, and mixture ratios of an active carbon material of polarized electrodes of another inventive electric double layer capacitor;

FIG. 8 is a diagram showing a table of various characteristics of the polarized electrodes of the electric double layer capacitor shown in FIG. 7; and FIG. 9 is a diagram showing a table of various characteristics of polarized electrodes of another inventive electric double layer capacitor.

DETAILED DESCRIPTION OF THE PREFERRED EMBODIMENTS

Figures 1, 2:
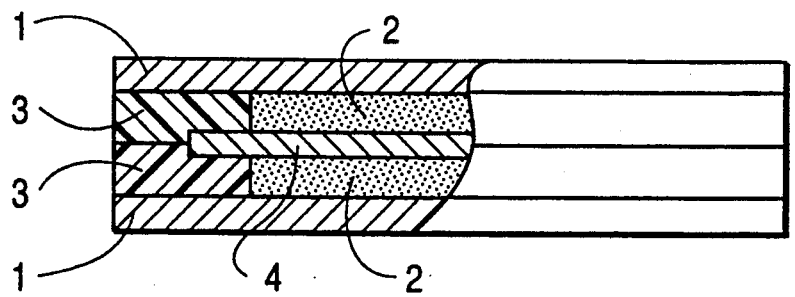
FIG. 1 is a front elevational view, partly in cross section, of an electric double layer capacitor according to the present invention.
FIG. 2 is a diagram showing a table of specific surface areas and average particle diameters of active carbon materials of polarized electrodes of inventive and conventional electric double layer capacitors.

FIG. 1 shows, partly in cross section, an electric double layer capacitor according to the present invention.

The electric double layer capacitor shown in FIG. 1 includes a pair of spaced current collectors 1 each made of an electrically conductive material such as electrically conductive rubber, and a pair of polarized electrodes 2 disposed between the current collectors 1 and each made of a paste of minute active carbon particles dispersed in and kneaded with an electrolytic solution such as dilute sulfuric acid. The electric double layer capacitor also has a pair of ring-shaped gaskets 3 positioned between the current collectors 1 and defining a space in which the polarized electrodes 2 are accommodated, each of the gaskets 3 being made of an electrically insulative material such as hard rubber or synthetic resin The gaskets 3 and the current collectors 1 are sealingly bonded to each other by an adhesive. The electric double layer capacitor also includes an isolating membrane 4 disposed between the polarized electrodes 2 and also between the gaskets 3. The isolating membrane 4 comprises an ion-permeable membrane which allows ions to pass therethrough but prevents electrons from passing therethrough. The polarized electrodes or paste carbon electrodes 2 are separated from each other by the isolating membrane 4. The gaskets 3 and the isolating membrane 4 are sealingly bonded to each other by an adhesive.

The minute active carbon particles of the polarized electrodes 2 are in the form of mesocarbon microbeads which are produced by heating a bituminous material such as coal tar, coal tar pitch, or a petroleum heavy oil to a temperature ranging from 350° C. to 500° C. to cause the low-molecular material to be converted into a high-molecular material through repeated polycondensation, thus producing small optically anisotropic balls, i.e., mesocarbon microbeads. Before the mesocarbon microbeads thus produced by the heat treatment process are combined with each other, they are separated from the matrix. The mesocarbon microbeads are a spherical carbon material having a structure analogous to graphite. Thereafter, the mesocarbon microbeads are surface-activated by a known process. In this manner, there are produced substantially spherical mesocarbon microbeads having a high specific surface area ranging from 1,000 to 4,000 m$^2$/gram with a relatively high yield.

One process for surface activation will be described below. An aqueous solution and acetone are added to a spherical carbon material, and the mixture is stirred into a slurry, which is heated in streams of nitrogen into active carbon. The active carbon is then washed with water to remove impurities therefrom, and then dried in vacuum.

Examples of the electric double layer capacitor which are composed of the minute active carbon particles thus produced and have different specific surface areas, will be described below.

FIG. 2 shows active carbon materials, specific surface areas, and average active carbon particle diameters of the polarized electrodes of seven electric double layer capacitors indicated as samples A through F. The samples A through E have polarized electrodes of minute active carbon particles formed from coal tar. The samples F and G are conventional electric double layer capacitors whose polarized electrodes are made of active carbon materials of phenolic resin and petroleum coke, respectively. The samples F and G are employed for comparison of characteristics.

Each of the electric double layer capacitors indicated as the samples A through G is disc-shaped and has gaskets 3 having an outside diameter of 20 mm and a thickness of 3.4 mm. The distance from the partition membrane 4 to the upper or lower current collector 1 is 1.5 mm. The polarized electrodes of each electric double layer capacitor is composed of a mixture of active carbon and 30 wt % of sulfuric acid.

FIG. 3 illustrates electrostatic capacitances, packing densities, and packing specific surface areas of the polarized electrodes of the electric double layer capacitors as the samples A through G. The samples B, C, D whose polarized electrodes are made of minute active carbon particles having a specific surface area ranging from 2,000 to 4,000 m$^2$/gram have greater electrostatic capacitances than the other samples.

Figure 4:
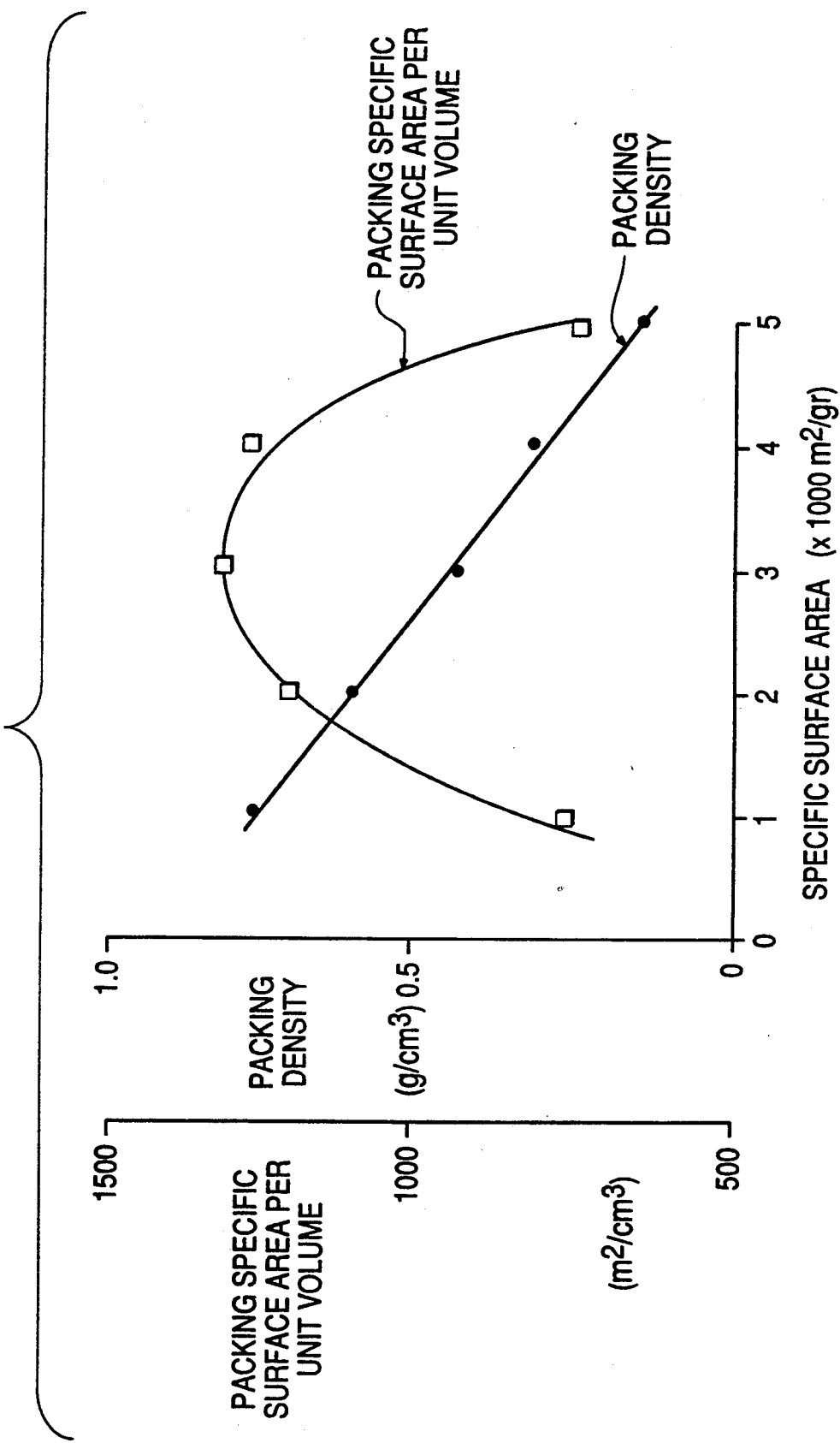
FIG. 4 is a diagram showing the packing densities and packing specific surface areas of the polarized electrodes of the inventive electric double layer capacitors.

FIG. 4 shows the packing densities and packing specific surface areas of the polarized electrodes of the electric double layer capacitors according to the present invention. The graph of FIG. 4 has a horizontal axis representing specific surface areas of the minute active carbon particles of the polarized electrodes and a vertical axis representing packing specific surface areas and packing densities per unit volume. Study of FIG. 4 clearly indicates that the electrostatic capacitance is much greater if minute active carbon particles having a specific surface area ranging from 2,000 to 4,000 m$^2$/gram are employed as the polarized electrodes. The reasons for the higher electrostatic capacitance appear to be the fact that since the minute active carbon particles are nearly spherical small balls, they can be packed neatly in a unit volute without large dead spaces, and the minute active carbon particles have more small holes, few Ångströms large, in their surfaces than the other minute active carbon particles.

Another electric double layer capacitor according to the present invention whose carbon electrodes are made of mixed minute active carbon particles having different diameters will be described below.

The electric double layer capacitor comprises polarized carbon electrodes made of minute active carbon particles having a particle diameter of 20 μm and kneaded with 80% of an electrolytic solution and minute active carbon particles having a particle diameter of 5 μm and kneaded with 20% of an electrolytic solution. The electric double layer capacitor is disc-shaped and has gaskets 3 having an outside diameter of 20 mm and a thickness of 3.4 mm. The distance from the isolating membrane 4 to the upper or lower current collector 1 is 1.5 mm. The active carbon of the carbon electrodes is kneaded with 30 wt % of sulfuric acid.

FIG. 5 illustrates electrostatic capacitances, packing densities, and packing specific surface areas of the polarized electrodes of the above electric double layer capacitor indicated as a sample A and a conventional electric double layer capacitor indicated as a sample B. The electric double layer capacitor indicated as the sample B employs minute active carbon particles made from phenolic resin.

FIG. 6 shows characteristics of the samples A and B shown in FIG. 5. The sample B is of the same shape and dimensions as the sample A.

As shown in FIG. 6, the sample A has a higher packing density ρ of the minute active carbon particles than the sample B. The packing density ρ of the sample A is about 8.4% higher than the packing density ρ of the sample B. The packing density of the minute active carbon particles of the inventive electric double layer capacitor is not higher than 0.65 g/cm$^3$ because the specific surface area of the minute active carbon particles of phenolic resin is about 2,000 m$^2$/gram at maximum and cannot be greater, and the minute active carbon particles of coal tar having a low specific surface are is employed for comparison between the electric double layer capacitors which have polarized electrodes of coal tar and phenolic resin that have the same specific surface area.

FIG. 7 shows particle diameters, a specific surface area, and mixture ratios of an active carbon material of polarized electrodes of another electric double layer capacitor according to the present invention. The electric double layer capacitor has polarized electrodes of minute active carbon particles having particle diameters, a specific surface area, and mixture ratios as shown in FIG. 7. The electric double layer capacitor is disc-shaped and has gaskets 3 having an outside diameter of 20 mm and a thickness of 3.4 mm. The distance from the isolating membrane 4 to the upper or lower current collector 1 is 1.5 mm. The polarized electrodes of each electric double layer capacitor is composed of a mixture of active carbon and 30 wt % of sulfuric acid. FIG. 8 shows characteristics of the electric double layer capacitor shown in FIG. 7. As shown in FIG. 8, the electric double layer capacitor has an electrostatic capacitance which is 41.3% greater than the sample B shown in FIG. 6.

FIG. 9 shows characteristics of another electric double layer capacitor according to the present invention. The electric double layer capacitor shown in FIG. 9 comprises polarized electrodes of minute active carbon particles formed form coal tar and sintered by a spark electric discharge into sintered disc-shaped solid bodies. The polarized electrodes are impregnated with 30 wt % of sulfuric acid. The electric double layer capacitor has packings 3 having an outside diameter of 20 mm and a thickness of 3.4 mm. The distance from the partition membrane 4 to the upper or lower current collector 1 is 1.5 mm. The electric double layer capacitor has an electrostatic capacitance which is 54.8% greater than the sample B shown in FIG. 6.

In the above two electric double layer capacitors, each of the polarized electrodes is composed of a mixture of minute active carbon particles having two different particle diameters. However, each polarized electrode may be composed of a mixture of minute active carbon particles having three different particle diameters providing the particle diameters are between 20 μm and 5 μm.

According to the present invention, if an electric double layer capacitor has polarized carbon electrodes of minute active carbon particles whose diameter is 5 μm, the electric double layer capacitor has a high electrostatic capacitance. However, since the minute active carbon particles whose diameter is about 5 μm cannot easily be handled and tend to fly up easily with weak air currents, they are not suitable for the mass production of electric double layer capacitors. The minute active carbon particles which have a diameter of 20 μm can be handled better than those which have a diameter of 5 μm, but result in a lower electrostatic capacitance. If minute active carbon particles of coal tar which have two or more different particle diameters are mixed together, then those active carbon particles can be handled with ease, and the electrostatic capacitance resulting therefrom is higher than would be if the minute active carbon particles whose diameter is 20 μm were employed.

As described above, the electric double layer capacitor according to the present invention comprises polarized electrodes of minute active carbon particles made of coal tar which have a greater specific surface area and are substantially spherical. Since more minute active carbon particles with a high specific surface area can be packed into a given volume than conventional minute active carbon particles, the electric double layer capacitor according to the present invention has a higher electrostatic capacitance than the conventional electric double layer capacitors. Moreover, the electric double layer capacitor according to the present invention is inexpensive to manufacture since the minute active carbon particles of coal tar can be produced less costly than the conventional minute active carbon particles.

Although certain preferred embodiments have been shown and described, it should be understood that many changes and modifications may be made therein without departing from the scope of the appended claims.

What is claimed is:

1. An electric double layer capacitor comprising:
   a gasket assembly defining a space therein;
   a pair of polarized electrodes disposed in said space;
   an isolating membrane disposed between said polarized electrodes;
   a pair of current collectors disposed on and bonded to upper and lower surfaces, respectively, of said gasket assembly and said polarized electrodes; and
   each of said polarized electrodes being composed of minute active carbon particles of coal tar which have a specific surface area ranging from 1,000 to 4,000 m$^2$/gram, and an electrolytic solution.

2. An electric double layer capacitor according to claim 1, wherein each of said polarized electrodes comprises a paste of the minute active carbon particles and the electrolytic solution which are kneaded with each other.

3. An electric double layer capacitor according to claim 2, wherein said minute active carbon particles comprise a mixture of minute active carbon particles having different particle diameters.

4. An electric double layer capacitor according to claim 3, wherein said different particle diameters range from 20 μm to 5 μm.

5. An electric double layer capacitor according to claim 3, wherein said different diameters are 20 μm and 5 μm, the minute active carbon particles whose diameter is 20 μm being in the range of from 95% to 70%, and the minute active carbon particles whose diameter is 5 μm being in the range of from 5% to 30%.

6. An electric double layer capacitor according to claim 1, wherein each of said polarized electrodes comprises a sintered solid body of minute active carbon particles, said sintered solid body being impregnated with said electrolytic solution.

7. An electric double layer capacitor according to claim 6, wherein said minute active carbon particles comprise a mixture of minute active carbon particles having different particle diameters.

8. An electric double layer capacitor according to claim 7, wherein said different particle diameters range from 20 μm to 5 μm.

9. An electric double layer capacitor according to claim 7, wherein said different diameters are 20 μm and 5 μm, the minute active carbon particles whose diameter is 20 μm being in the range of from 95% to 70%, and the minute active carbon particles whose diameter is 5 μm being in the range of from 5% to 30%.

10. A process for forming active carbon particles having a diameter of 5 μm to 20 μm comprising the steps of:
 (a) heating a bituminous material to a temperature of between 350° C. and 500° C., sufficient to convert low-molecular material in the bituminous material into high-molecular material through repeated polycondensation to produce a matrix containing mesocarbon microbeads;
 (b) separating the mesocarbon microbeads from the matrix; and
 (c) surface activating the mesocarbon microbeads to produce the active carbon particles.

11. A method as recited in claim 10, wherein the bituminous material is one of coal tar, coal tar pitch and petroleum heavy oil.

12. An electrode in an electric double layer capacitor, prepared by a process comprising the steps of:
 (a) heating a bituminous material to a temperature between 350° C. and 500° C., sufficient to convert low-molecular material in the bituminous material into high-molecular material through repeated polycondensation to produce a matrix containing mesocarbon microbeads;
 (b) separating the mesocarbon microbeads from the matrix;
 (c) surface activating the mesocarbon microbeads to produce a active carbon particles; and
 (d) adding an electrolytic solution to the active carbon particles.

13. An electrode as recited in claim 12, wherein said adding in step (d) comprises kneading the electrolytic solution into the active carbon particles.

14. An electrode as recited in claim 12, further comprising the step of (e) sintering the carbon particles prior to said adding of the electrolytic solution in step (d).

* * * * *